US006513039B1

(12) United States Patent
Kraenzel

(10) Patent No.: US 6,513,039 B1
(45) Date of Patent: Jan. 28, 2003

(54) PROFILE INFERENCING THROUGH AUTOMATED ACCESS CONTROL LIST ANALYSIS HEURISTICS

(75) Inventor: Carl J. Kraenzel, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,174

(22) Filed: Jun. 24, 1999

(51) Int. Cl.[7] .............................................. G06F 17/30
(52) U.S. Cl. ......................................................... 707/9
(58) Field of Search ............................. 707/1, 5, 9, 101

(56) References Cited

U.S. PATENT DOCUMENTS

| | | | |
|---|---|---|---|
| 5,008,853 A | | 4/1991 | Bly et al. ..................... 364/900 |
| 5,263,157 A | * | 11/1993 | Janis .............................. 707/9 |
| 5,539,665 A | | 7/1996 | Lamming et al. ........... 364/514 |
| 5,710,884 A | | 1/1998 | Dedrick ................. 395/200.47 |
| 5,724,521 A | | 3/1998 | Dedrick ....................... 395/226 |
| 5,748,890 A | * | 5/1998 | Goldberg et al. ...... 395/188.01 |
| 5,754,939 A | * | 5/1998 | Herz et al. .................... 455/4.2 |
| 5,761,662 A | | 6/1998 | Dasan .......................... 707/10 |
| 5,768,508 A | | 6/1998 | Eikeland ................ 395/200.32 |
| 5,796,395 A | | 8/1998 | de Hond ...................... 345/331 |
| 5,796,952 A | | 8/1998 | Davis et al. ........... 395/200.54 |
| 5,797,001 A | | 8/1998 | Augenbraun et al. ....... 395/609 |
| 5,907,836 A | * | 5/1999 | Sumita et al. ................. 707/2 |
| 6,199,067 B1 | * | 3/2001 | Geller .......................... 707/10 |
| 2001/0011264 A1 | * | 8/2001 | Kawasaki ...................... 707/1 |

* cited by examiner

*Primary Examiner*—Wayne Amsbury
*Assistant Examiner*—Cam Linh Nguyen
(74) *Attorney, Agent, or Firm*—Mintz Levin Cohn Ferris Glovsky and Popeo PC

(57) ABSTRACT

A system, method, and computer readable medium for generating a profile of a network user based on a user's access privileges stored in an access control list (ACL). The system may include an accessible objects determining object for determining objects that are accessible by a particular user. An access privilege determining object may be used to determine a user's access privileges for each accessible object. The system may also include an object topic determining object for determining the subject matter of the object. The subject matter of the object may be used to generate a profile indicating a user's affinity (e.g., experience, knowledge, interest, etc.). A user affinity object may be used to determine a user's affinity based on, for example, the accessible objects, the user's access privileges, and the subject matter of the accessible objects. The system may also include a profile compiling/updating object that generates a user profile based on the user's affinity determined by the user affinity object. Preferably, the system includes editing and updating objects. An editing object may permit a user to edit the profile generated and an updating permits the system to update the profile (e.g., periodically or as desired).

29 Claims, 4 Drawing Sheets

PROFILE INFERENCING THROUGH AUTOMATED ACCESS CONTROL LIST ANALYSIS HEURISTICS

FIELD OF THE INVENTION

The invention relates to a system for generating a profile of a network user based on an access control list of the network.

BACKGROUND OF THE INVENTION

Systems which generate profiles of network users generally are known. Profile generating systems may be used in a client/server system having multiple users connected over a network. Users may also be connected to one or more databases via the network. Databases are used to store various objects. To prevent access to objects containing, for example, confidential or proprietary information, users may be assigned levels of access privileges. Access privileges may be, for example, read-only, edit, etc. Access privileges may be assigned by a system administrator (e.g., the object author or manager) and stored in an access control list (ACL). The system administrator may change the level of access privileges assigned to particular users at any given time.

Some profile generating systems generate and update a user profile each instance a user accesses a document. A reference to an accessed document is stored in the user's profile automatically and the user may not have any control over which references are stored in the profile. Therefore, if a user accidentally accesses an object, a reference to that object will be stored in the user's profile even though the object may have no association with the user.

Some prior systems also do not permit users to edit profiles. Accessed documents are automatically stored in the profile and may not be edited by the user. Still further systems require users to generate a profile by manually inserting and updating information in the profile.

Additionally, some prior systems do not allow other users on the network to search profiles. Profiles may be distributed automatically to other users who have expressed an interest in profiles containing predetermined criteria. This approach, however, does not permit system users to search profiles.

These and other drawbacks exist.

SUMMARY OF THE INVENTION

An object of the invention is to overcome these and other drawbacks in existing systems.

Another object is to provide a system and method that automatically generates a user profile according to an access control list that is based on objects accessible by the user.

Another object of the invention is to provide a system and method for generating a user profile that maintains a user profile based on a user's object access privileges.

Another object of the invention is to provide a system and method for generating a user profile based on user affinities.

Another object is to provide a system and method for generating a user profile that enables users to select which user affinities are inserted into the profile.

Another object is to provide a system and method for generating a user profile that enables users to edit the profile.

These and other objects of the invention are achieved according to various embodiments of the invention. According to one embodiment, a system, method, and computer usable medium comprising computer readable program code embodied therein are provided that generate a profile of a network user based on objects stored in an access control list (ACL). The system includes an ACL accessing object. The ACL accessing object communicates with an access determining object. The access determining object communicates with a topic determining object and subsequently with a user privilege determining object. The user privilege determining object communicates with a user affinity determining object which communicates with a profile compiling/updating object to generate a user profile.

According to one embodiment of the invention, an ACL accessing object accesses an ACL. The ACL may contain, for example, a list of objects (e.g., files, documents, etc.) to which a user has access. An access determining object then determines the objects to which a particular user has access. After determining all of the objects accessible by a user, the topic determining object determines the subject-matter of the accessible objects. A user privilege determining object then determines the user privileges associated with each accessible object. The system then applies inferencing rules against the determinations made. Using the inferencing rules, the system calculates a user's affinity for each accessible object and related subject matter. After determining the user's affinity, the system compiles/updates a user profile reflecting a user's affinity.

These and other objects, features, and advantages of the invention will be readily apparent to those having ordinary skill in the pertinent art from the detailed description of the preferred embodiments with reference to the appropriate figures.

DETAILED DESCRIPTION OF THE PREFERRED EMBODIMENTS

A system and method for generating a profile of one or more system users is disclosed. The system may be used to generate, update, store, and search profiles stored in one or more databases. Additionally, the system may be used to search at least one field within one or more objects stored in the database.

Figure 1:
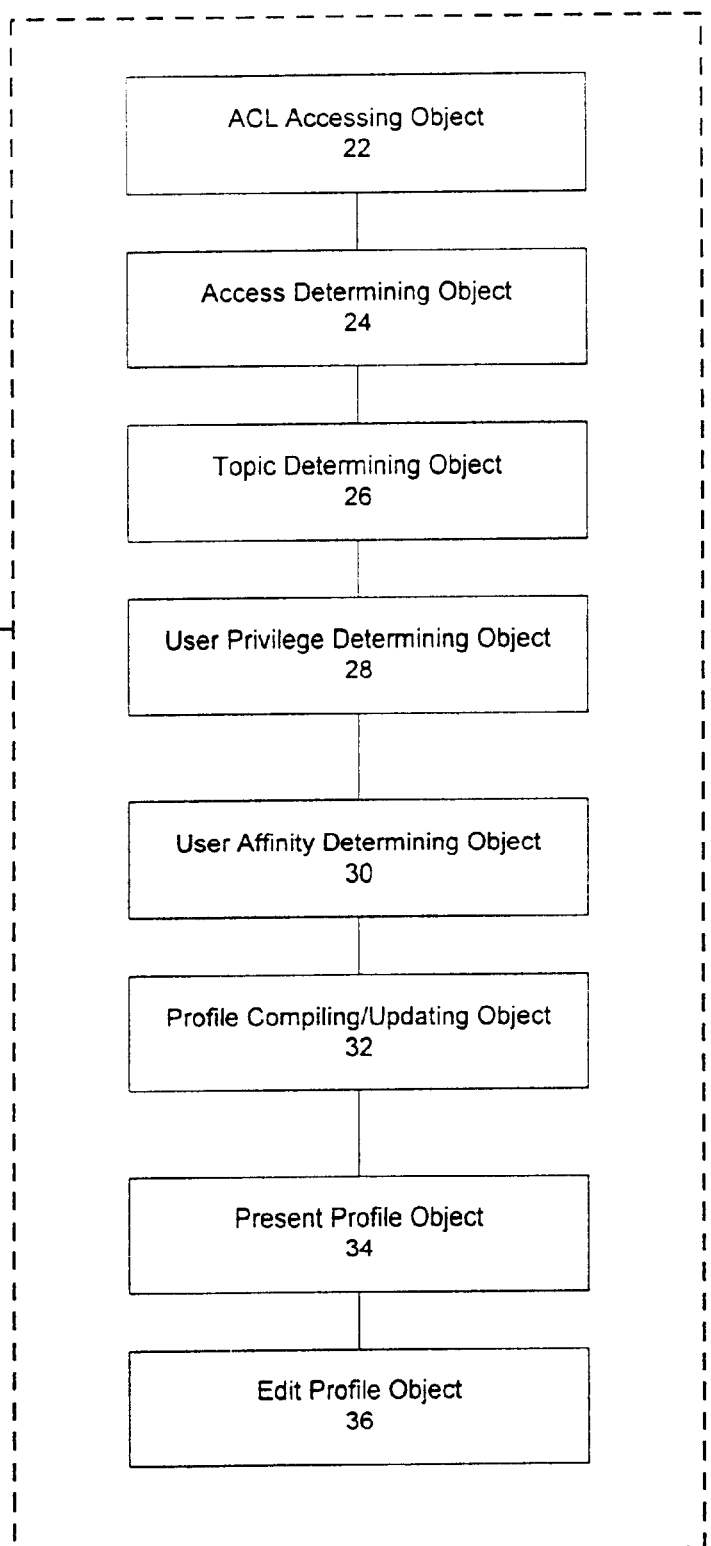
FIG. 1 is a schematic diagram of a system for generating a user profile in accordance with a preferred embodiment of the invention.

FIG. 1 illustrates one embodiment of a profile system 14. Profile system 14 may include an ACL accessing object 22 for accessing an ACL of a network. ACL accessing object 22 may communicate with access determining object 24. Access determining object 24 may communicate with a topic determining object 26. A user privilege determining object 28 may then receive information from topic determining object 26 and communicate all information received to a user affinity determining object 30. A profile compiling/updating object 32 may use the information received from user affinity determining object 30 to generate a user profile.

According to one embodiment of the invention, profile system 14 generates a user profile for users of a network. Generating (or updating) a profile may begin with ACL accessing object 22 accessing an ACL of the network. After accessing the ACL, access determining object 24 may be used to determine the objects accessible by a particular user (e.g., which objects the user has been given access privileges). Topic determining object 26 may then determine the topic (e.g., subject-matter) of each accessible object and user privilege determining object 28 may be used to determine the privilege(s) (e.g., read-only, manager, etc.) assigned to the user for each accessible object. Based on the information gathered by access, topic, and user privilege determining objects 24, 26, and 28, respectively, user affinity determining object 30 may determine a user's affinity.

The user's affinity may be determined, for example, by applying a series of inferencing rules. The inferencing rules may be associated with a user's access privileges. For example, if a user has managerial privileges for objects relating to digital signal processing, user affinity determining object 30 may determine that the user has knowledge and/or experience with digital signal processing. If, however, a user has read-only access privileges to objects relating to frequency modulation, user affinity determining object 26 may determine that the user has an interest, but no experience, in frequency modulation. Other types of inferencing rules are also possible.

After an affinity determination has been established, profile compiling/updating object 32 may generate a user profile. A present profile object 34 may be used to present the profile to the user. Preferably, profile system 14 includes an edit profile object 36 that permits the user to edit the profile.

Once a user profile has been generated, profile system 14 may, for example, automatically update a user's profile by periodically checking the ACL of the network. This may be performed on a routine basis (e.g., weekly, daily, hourly, etc.), on a random basis, when requested by a system administrator, when requested by the user, or at various other instances. System 14 may also use the above process for updating a user profile. Instead of generating a new user profile, profile compiling/updating object 28 may simply add supplemental information to the user profile.

Figure 2:
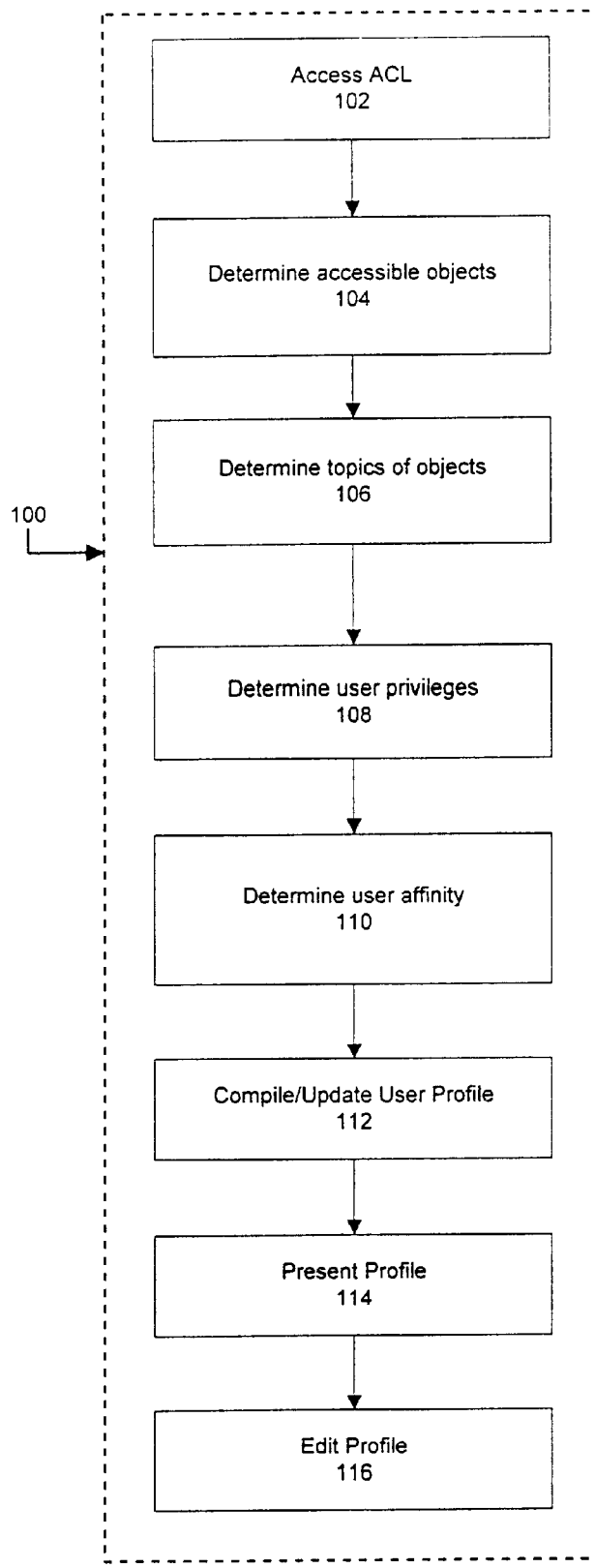
FIG. 2 is a schematic diagram of a method for generating a user profile in accordance with a preferred embodiment of the invention.

FIG. 2 illustrates a method 100 for generating a user profile in accordance with one embodiment of the invention. According to method 100, profile system 14 may use a data-mining technique to generate a user profile. The data-mining technique may include step 102. Step 102 permits profile system 14 to access an ACL of a network. After accessing the ACL, step 104 determines the objects which are accessible by one or more users. This step may be performed, for example, by determining whether a user has rights to access one or more objects. Step 106 determines the topics of the objects accessible by a user. Step 106 may perform, for example, a text extraction of main words in a title, repeated words, or other keywords to determine the topics of each accessible object. Based on the objects accessible by a user, step 108 determines the privileges assigned to a user for each of the accessible objects. After determining a user's privileges in step 108, step 110 determines a user's affinity with each of the accessible objects based on steps 106 and 108. Step 110 may, for example, use a series of inferencing rules to determine a user's affinity. The inferencing rules may include, for example, inserting keywords into particular fields within the profile (described in greater detail below).

Finally, step 112 compiles/updates a user profile based on the affinity (or affinities) determined in step 110. Step 112 may generate a profile including a plurality of fields. For example, a profile may include "interest," "responsibilities," and "skills" fields. The inferencing rules may insert keywords from a title of a database which stores a particular object or commonly occurring words from a database into a field which reflects the affinity of the user. For example, if a user has read-only access for a particular object, keywords may be inserted into the "interests" field. If, however, a user is a manager or author of a particular object, keywords from that object may be inserted into the "responsibilities" or "skills" fields (or both), respectively. Profile system 14 may also enable users to activate and deactivate one or more inferencing rules as desired.

Step 114 may be used to present a profile. Step 116 may be used to enable a user to edit a profile presented to the user.

Further, profile system 14 may be provided on a computer readable storage medium and loaded onto a computer system. Other objects of profile system 14 may also be provided on a computer readable storage medium.

Figure 3:
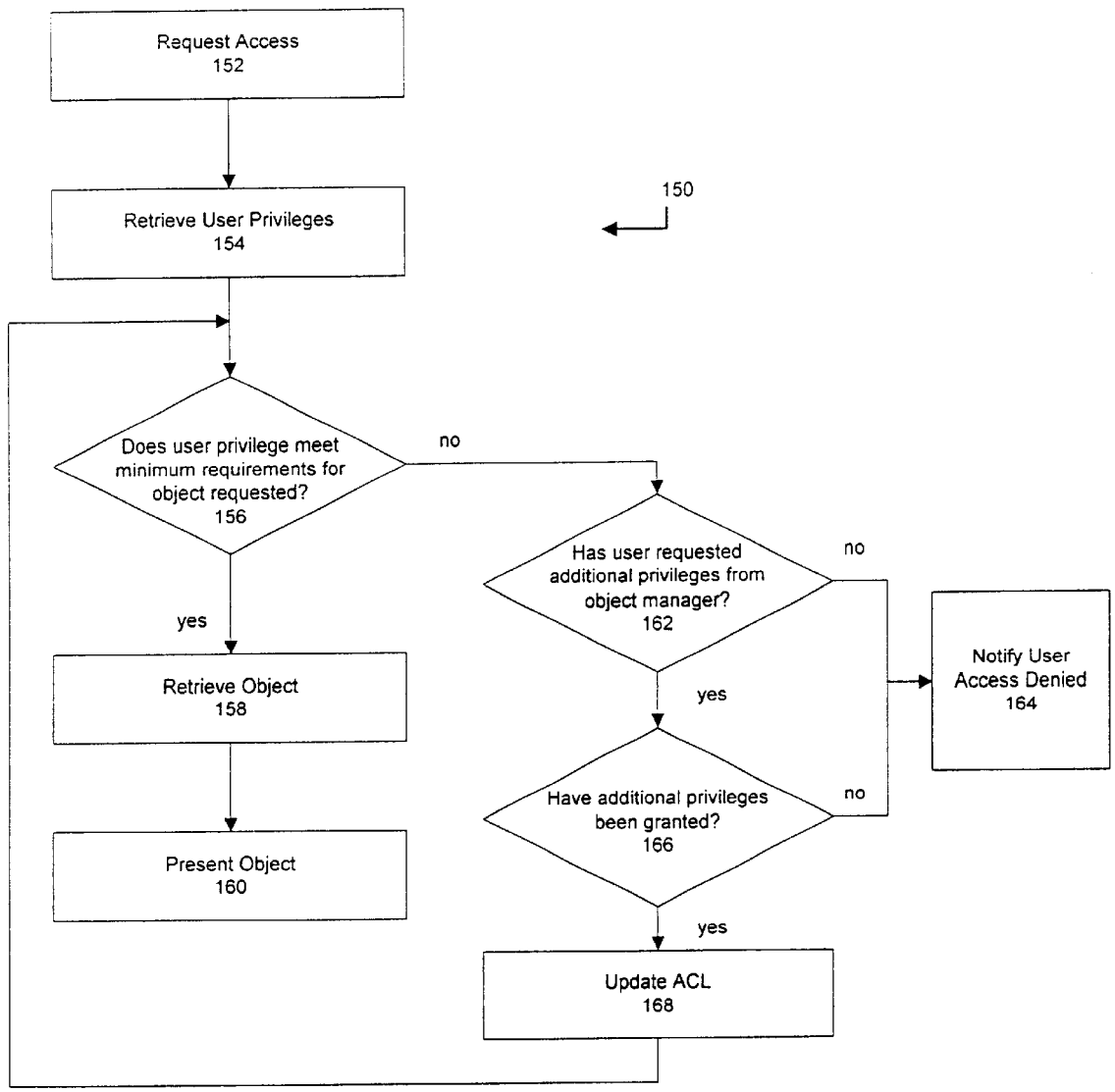
FIG. 3 is a schematic diagram of a method for accessing an object in accordance with a preferred embodiment of the invention.

FIG. 3 illustrates a method 150 for accessing an object in a database in accordance with one embodiment of the invention. Step 152 accesses a database containing one or more objects requested by a user. After accessing the database, step 154 may retrieve the user's access privileges for the object(s) requested. Based on step 154, step 156 determines whether the user's access privileges meet the minimum requirements set by the object administrator. If the user's access privileges meet the minimum requirements, step 158 retrieves the requested object and step 160 presents the object(s) to the user. If, however, step 156 determines that the user's access privileges do not meet the minimum requirements set by a system administrator for that object(s), step 162 determines whether the user has requested additional privileges from the system administrator. If additional privileges have not been requested, step 164 notifies the user that access has been denied. Otherwise, step 166 determines if additional privileges have been granted. If additional privileges have been granted, step 168 updates the ACL and may proceed to retrieve and present the requested object using steps 158 and 160 respectively. If step 166 determines that additional privileges have not been granted, the user may be notified that access has been denied using step 164.

Figure 4:
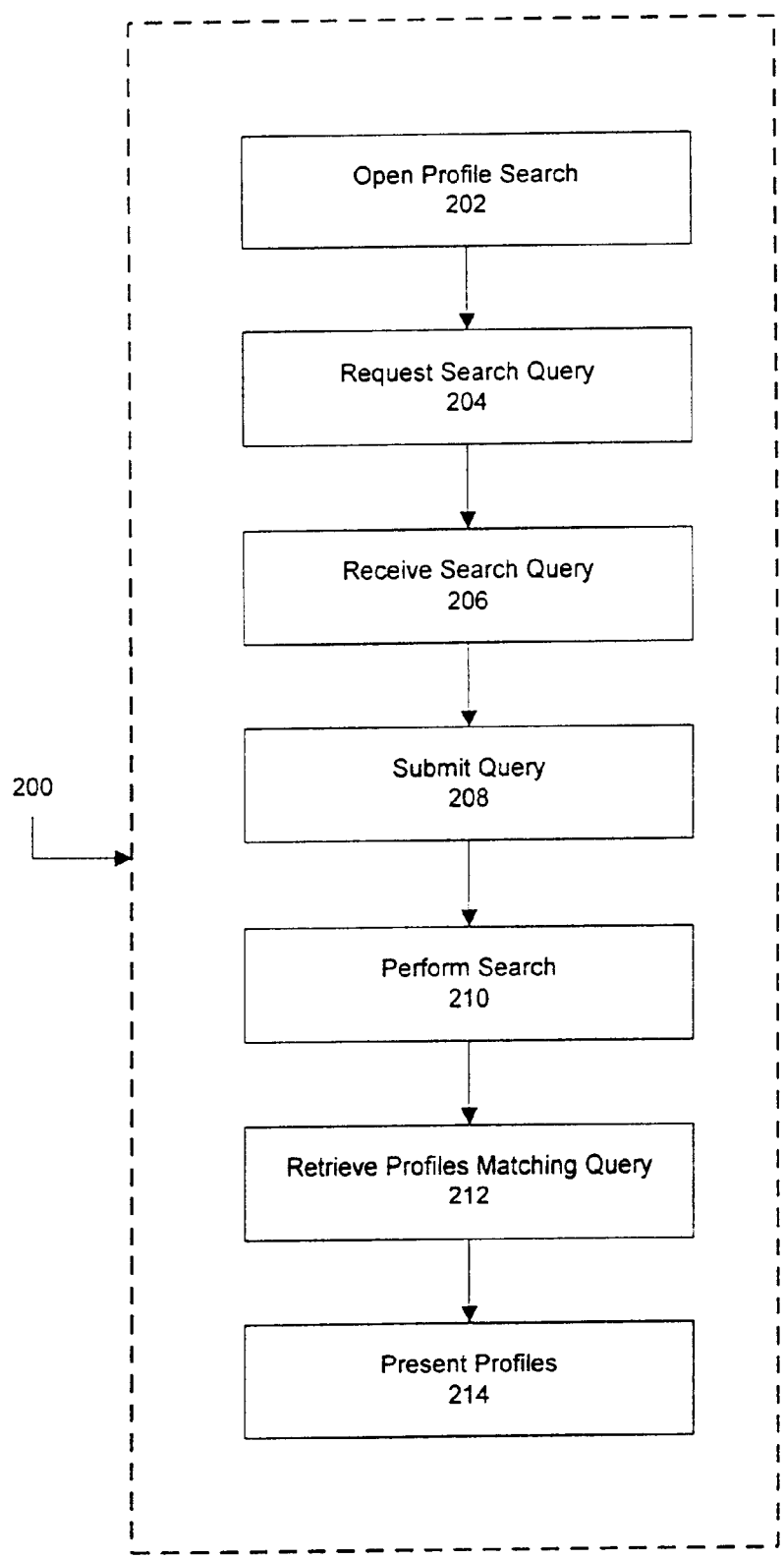
FIG. 4 is a schematic diagram of a method for searching a user profile in accordance with a preferred embodiment of the invention.

FIG. 4 illustrates a method 200 of searching stored profiles in accordance with one embodiment of the invention. Step 202 invokes a profile search in response to a user request. Step 204 requests a search query to be used for searching profiles stored in a database. The search query may contain, for example, keywords relating to particular topics. The search query may be received from the user using step 206. After a user completes the search query and initiates a search, step 208 may be used to submit the query. A profile search may then be performed using step 210. All profiles matching the query may be retrieved using step 212. The matching profiles may then be presented to the user using step 214. After presenting the profiles, the user may, for example, browse the profiles to determine which user is most associated with the topic(s) searched. It should be noted that if the search does not uncover profiles which match the query, no profiles are retrieved or presented and the user may be notified accordingly. For example, the user may receive a message indicating that no matching profiles were discovered.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for generating a profile of a system user comprising the steps of:
   (a) searching an access control list for objects that the user has permission to access;
   (b) determining a user affinity for objects based on series of plurality of rules, the rules comprising the permissions assigned to the user for each of the user accessible objects, wherein the affinity is determined regardless of whether the user has actually ever accessed the objects; and
   (c) generating a user profile based on the user affinity.

2. The method of claim 1, wherein the step of determining a user affinity determines the user affinity based on user access privileges for the objects accessible by the user.

3. The method of claim 1, wherein the step of determining a user affinity determines the user affinity based on a topic of the objects accessible by the user.

4. The method of claim 1, further comprising the step of updating the user profile periodically.

5. The method of claim 1, further comprising the step of updating the user profile incrementally.

6. The method of claim 1, further comprising the step of inserting keywords into the user profile based on the access privileges and the user affinity.

7. The method of claim 6, wherein the step of inserting keywords inserts one or more keywords based on one or more inferencing rules.

8. A system for generating a profile of a system user comprising:
   storing means for storing an access control list;
   accessing means for accessing the list;
   accessible object determining means for determining the objects in the list that the user has permission to access;
   affinity determining means, responsive to the accessible object determining means, for determining a user affinity for the objects based on series of plurality of rules, the rules comprising the permissions assigned to the user for each of the user accessible objects, wherein the affinity is determined regardless of whether the user has actually ever accessed the objects; and
   profile generating means, responsive to the affinity determining means, for generating a user profile.

9. The system of claim 8, further comprising access privilege determining means for determining user access privileges for objects accessible by the user.

10. The system of claim 8, further comprising topic determining means for determining a topic of the objects accessible by the user.

11. The system of claim 8, further comprising updating means for updating the user profile.

12. The system of claim 8, further comprising keyword inserting means for inserting keywords into the user profile based on the access privileges and the user affinity.

13. The system of claim 12, wherein the keyword inserting means uses one or more inferencing rules for selecting the one or more keywords.

14. The system of claim 8, further comprising searching means for enabling the user to search the user profile.

15. The system of claim 8, further comprising editing means for enabling the user to edit the user profile.

16. A system for generating a profile of a system user comprising:
   an accessing object that accesses an access control list that stores a list of objects;
   an access determining object that determines the objects in the list that the user has permission to access;
   an affinity determining object that determines a user affinity for the objects based on series of plurality of rules, the rules comprising the permissions assigned to the user for each of the user accessible objects, wherein the affinity is determined regardless of whether the user has actually ever accessed the objects; and
   a generating object, responsive to the affinity determining object, that generates a user profile.

17. The system of claim 16, further comprising an access privilege determining object that determines access privileges of the user for the objects accessible by the user.

18. The system of claim 16, further comprising a topic determining object that determines a topic of the objects accessible by the user.

19. The system of claim 16, further comprising a keyword inserting object that inserts one or more keywords into the user profile based on the access privileges and the user affinity.

20. The system of claim 19, wherein the keyword inserting means uses one or more inferencing rules for selecting the one or more keywords.

21. The system of claim 16, further comprising an updating object that updates the user profile.

22. The system of claim 16, further comprising a searching object that enables the user to search the user profile.

23. The system of claim 16, further comprising an editing object that enables the user to edit the user profile.

24. A computer usable medium having computer readable program code embodied therein for generating a user profile, the computer readable program code comprising:
   computer readable program code that causes a computer to search an access control list for objects that the user has permission to access;
   computer readable program code that causes a computer to determine a user affinity for the objects based on series of plurality of rules, the rules comprising the permissions assigned to the user for each of the user accessible objects, wherein the affinity is determined regardless of whether the user has actually ever accessed the objects; and
   computer readable program code, responsive to the computer readable code for determining a user affinity, that causes a computer to generate a user profile.

25. The computer usable medium of claim 24, further comprising computer readable program code that causes a computer to determine access privileges of the user for the objects accessible by the user.

26. The computer usable medium of claim 24, further comprising computer readable program code that causes a computer to determine a topic of the objects accessible by the user.

27. The computer usable medium of claim 24, further comprising computer readable program code that causes a computer to insert one or more keywords into the profile based on the access privileges and the user affinity.

28. The computer usable medium of claim 27, further comprising computer readable program code that causes a computer to insert the one or more keywords based on one or more inferencing rules.

29. The computer usable medium of claim 24, further comprising computer readable program code that causes a computer to update the user profile.

* * * * *